United States Patent [19]

Lindmayer

[11] Patent Number: 5,043,096
[45] Date of Patent: Aug. 27, 1991

[54] THERMOLUMINESCENT MATERIAL INCLUDING LANTHANUM, EUROPIUM AND CERIUM DOPANTS

[75] Inventor: Joseph Lindmayer, Potomac, Md.

[73] Assignee: Quantex Corp., Rockville, Md.

[21] Appl. No.: 651,967

[22] Filed: Feb. 7, 1991

Related U.S. Application Data

[60] Continuation-in-part of Ser. No. 331,747, Apr. 3, 1989, abandoned, which is a continuation-in-part of Ser. No. 178,201, Apr. 6, 1988, Pat. No. 4,818,434, which is a division of Ser. No. 798,297, Nov. 15, 1985, Pat. No. 4,755,324.

[51] Int. Cl.$^5$ .............................. C09K 11/56
[52] U.S. Cl. ................. 252/301.4 S; 252/301.4 H
[58] Field of Search .................. 252/301.4 S, 301.4 H

[56] References Cited

U.S. PATENT DOCUMENTS

| | | | |
|---|---|---|---|
| 3,673,102 | 6/1972 | Lehmann et al. | 252/301.4 S |
| 4,374,037 | 2/1983 | Takahashi | 252/301.4 S |

FOREIGN PATENT DOCUMENTS

| | | | |
|---|---|---|---|
| 30853 | 6/1981 | European Pat. Off. | 252/301.4 S |
| 57610 | 8/1982 | European Pat. Off. | 252/301.4 S |
| 57-128779 | 8/1982 | Japan | 252/301.4 S |

*Primary Examiner*—Jack Cooper
*Attorney, Agent, or Firm*—Ostrolenk, Faber, Gerb & Soffen

[57] ABSTRACT

Materials having thermoluminescent properties using a base material and three dopants and made from a process of mixing the parts together, heating the mixture to fuse together, grinding the mass into a fine powder, and reheating the powder. The resultant powder may be combined with a vehicle to form a paint. A fusible salt may be used in making the thermoluminescent material. The dopants are preferably $La_2O_3$, $Eu_2O_3$ and $CeO_2$.

2 Claims, 2 Drawing Sheets

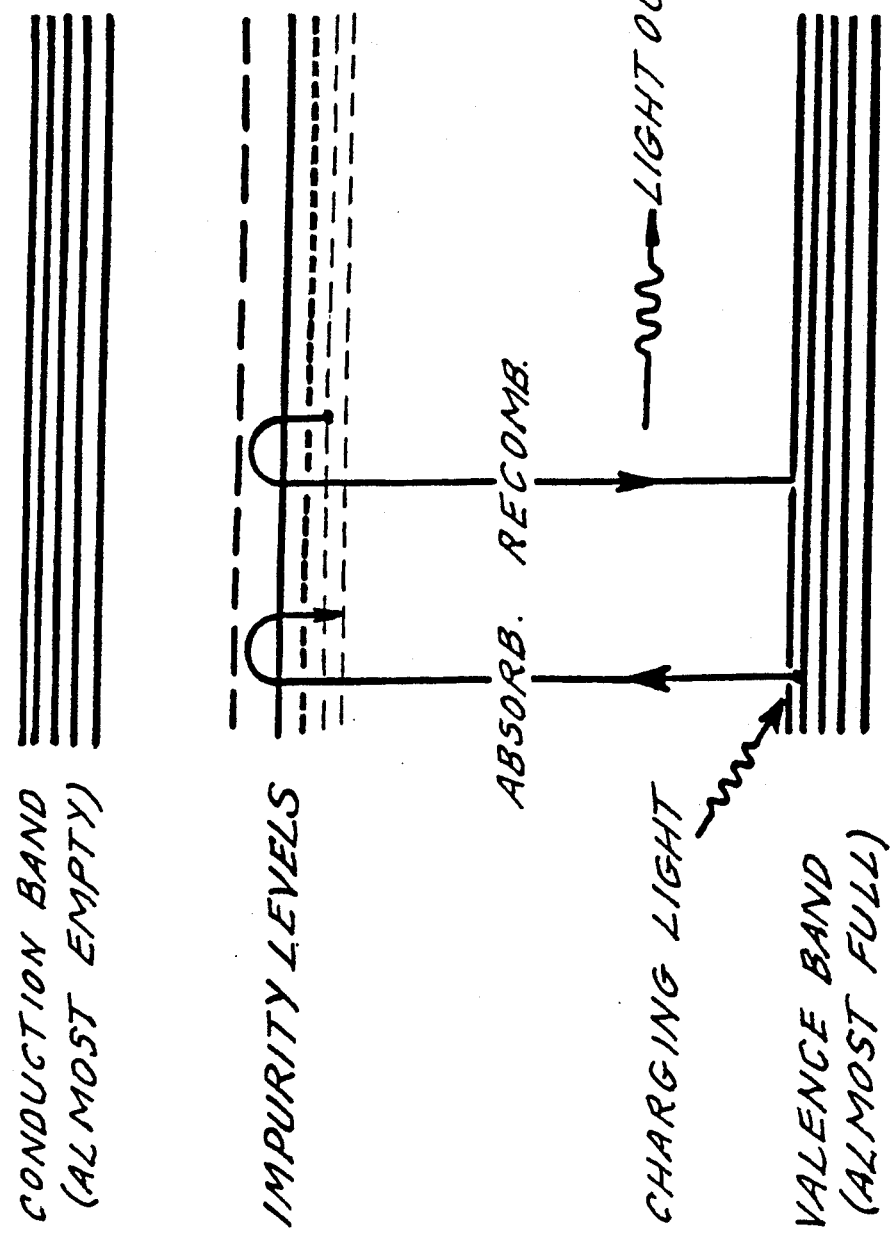

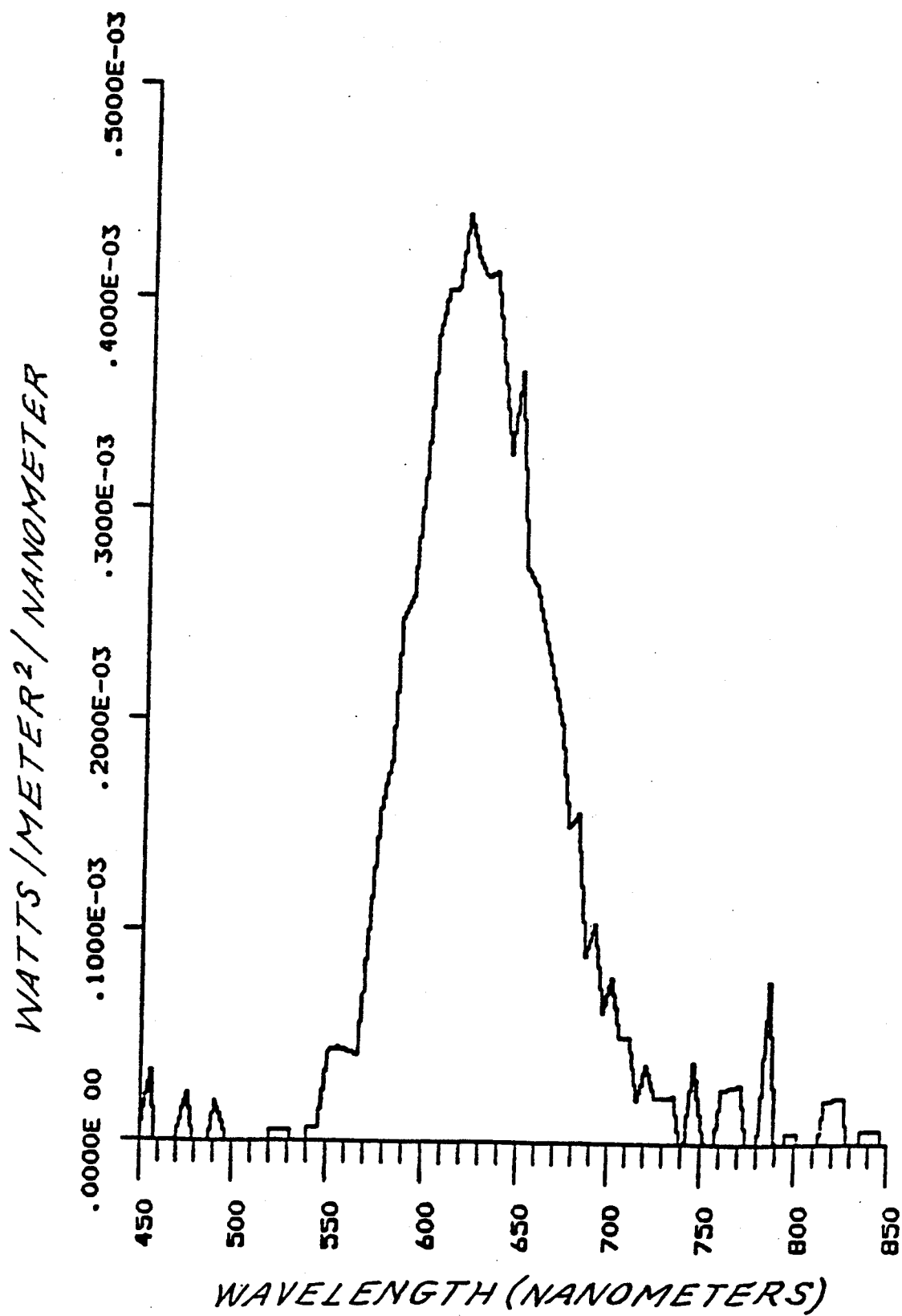

THERMOLUMINESCENT MATERIAL INCLUDING LANTHANUM, EUROPIUM AND CERIUM DOPANTS

RELATED APPLICATIONS

This is a continuation-in-part of U.S. application Ser. No. 331,747, filed Apr. 3, 1989, now abandoned which is a continuation-in-part of U.S. application Ser. No. 178,201, filed Apr. 6, 1988, now U.S. Pat. No. 4,818,434, which is a division of U.S. application Ser. No. 798,297, filed Nov. 15, 1985, now U.S. Pat. No. 4,755,324, the disclosures of which are herein incorporated by reference.

BACKGROUND OF THE INVENTION

This invention relates to thermoluminescent material and associated uses and associated process for making thermoluminescent material.

"Thermoluminescence" is often used to mean any luminescence appearing in a material due to the application of heat. As used hereinafter "thermoluminescence" refers to the emission of light due to the freeing of trapped electrons by application of thermal energy.

Many solids that contain luminescent centers often contain one or more types of centers that trap electrons. Upon application of suitable wavelengths of light or application of x-rays, such solids produce excited electrons. Upon removal of energizing light, x-rays or other radiation, the excited electrons may be trapped at an energy level higher than their ground state. If the depth of the trap (that is, the amount of energy required to release the electron from the trap) is large and the temperature is low, the electron will remain trapped for a long time. However, if the trap depth is sufficiently low, the solid may receive sufficient thermal energy to free such trapped electrons even at room temperature. An electron freed from a trap will return to its ground state and emit a photon.

Thermoluminescence may be characterized as a type of phosphorescence. Phosphorescence is generally considered a delayed light emission after the removal of a source of exciting energy used to cause electrons to assume an energy state higher than their ground level. Such "phosphorescence", often called "afterglow", will be used herein to refer to delayed emission having a duration which becomes shorter with increasing temperature.

Although various thermoluminescent materials have been heretofore developed, practical uses of such materials has been limited due to numerous limitations in the materials themselves. For example, some materials require a relatively high energy input (light used to excite electrons) in order to trap a sufficient number of electrons to provide a relatively low afterglow effect. On the other hand, materials which are more efficient at trapping electrons may have trap depths which preclude room temperature level thermal energy from releasing the electrons and causing the light emission. Although the latter materials may be useful for other phenomena, such trap depths are not desirable or suitable for thermoluminescent material. Materials which have a very low electron trap depth do not store electrons sufficiently securely to allow an afterglow effect to last for an appreciable time after removal of the light or other energy used to excite the electrons.

The above and other limitations were disadvantages of previously available thermoluminescent materials, which have greatly limited the possible applications for using the phenomena of thermoluminescence Additionally, the range of possible uses for thermoluminescent material has been limited by the restrictions in form of various thermoluminescent materials.

OBJECTS AND SUMMARY OF THE INVENTION

Accordingly, it is the primary object of the present invention to provide a new and improved thermoluminescent material.

A more specific object of the present invention is to provide thermoluminescent material providing for a relatively high density of trapped electrons for a relatively low amount of input excitation energy.

A still further object of the present invention is to provide a thermoluminescent material having desirable electron trap depth characteristics Yet another object of the present invention is to provide thermoluminescent material which provides afterglow for a relatively long period of time after excitation energy has been removed.

A still further object of the present invention is to provide various uses for thermoluminescent material.

A still further object of the present invention is to provide thermoluminescent material in a form suitable for numerous uses.

Another object of the present invention is to provide a paint having thermoluminescent material.

Yet another object of the present invention is to provide a paint having thermoluminescent material.

Yet another object of the present invention is to provide a process for making thermoluminescent material into a highly useful form.

The present invention may be described as a crystalline thermoluminescent material consisting essentially of: base material selected from the group of alkaline earth metal sulfides, preferably strontium sulfide; a fusible salt, there being at most 2 parts fusible salt for every 10 parts of base material by weight; first, second and third dopants, the first dopant being a lanthanum compound, and the second dopant being a europium compound, and the third dopant being a cerium compound; and wherein the thermoluminescent material provides electron trapping with effective trap depths between 0.4 eV and 0.7 eV.

Instead of using a fusible salt as the carrier for the dopants, the dopants can be diffused by a gaseous diffusion method in an inert gas such as $N_2$ carrying the dopants. The first dopant is preferably lanthanum trioxide, the second dopant is preferably europium trioxide, and the third dopant is preferably cerium oxide.

The process of the present invention comprises the steps of: mixing: a base material selected from the group of alkaline earth metal sulfides, preferably strontium sulfide a fusible salt, there being at most 2 parts fusible salt for every 10 parts of base material by weight; lanthanum trioxide, europium trioxide and cerium oxide; after the mixing, heating the resultant mixture to a temperature sufficient to interdiffuse the mixture and allow crystallite growth; after the heating, grinding the resultant crystalline form into a powder; and after the grinding, reheating the resultant powder at a reheating temperature below the previous temperature and sufficient to repair crystal edges of the powder to yield a thermoluminescent material without fusing the powder into a mass. The lanthanum trioxide, europium trioxide and cerium oxide are mixed in such quantities that the resultant powder has between 100 and 1000 parts per million of lanthanum trioxide, preferably 600 plus or minus 10% parts per million of lanthanum trioxide, between 100 and 1000 parts per million of europium trioxide, preferably 300 plus or minus 10% parts per million of europium trioxide, and between 100 and 1000 parts per million of cerium oxide, preferably 600 plus or minus 10% parts per million of cerium oxide. The process may further include the step of, after the reheating, placing the powder into a liquid vehicle to form a thermoluminescent paint. The process may further include the step of applying the thermoluminescent paint to a substrate. The process may further include the step, after the reheating, of placing the powder into a vehicle to form thermoluminescent cosmetic material. The process may alternately include the step of, after the reheating, binding the thermoluminescent material to a textile material.

In general, afterglow of the materials of the invention are temperature dependent and the period of afterglow can be expressed as 1/Time, that is, the afterglow decreases inversely with time. Similar results were found in electronic currents in insulators as discussed in my article "Current Transient in Insulators", *Journal of Applied Physics*. Vol. 36 No. 1, pp. 196–201, January 1965.

BRIEF DESCRIPTION OF THE DRAWINGS

The above and other features of the present invention will be more readily understood when the following detailed description is considered in conjunction with the accompanying drawings, wherein:

FIG. 1 shows a diagram illustrating electron trapping as exhibited by the present invention.

FIG. 2 shows an emission spectrum of an embodiment of the present invention.

DETAILED DESCRIPTION OF THE PREFERRED EMBODIMENT

FIG. 1 shows the principle of operation of the material of the present invention. An electron at a valence band is caused to be trapped at an impurity level by absorption of light as shown at the left side of the diagram, whereas thermal energy may cause the electron to overcome a trap depth and return to valence band (right side of diagram) causing the emission of a proton.

When the thermoluminescent material is mixed with a vehicle or binder to form a paint, the painted objects will glow upon illumination by light. This means the headlight of an automobile, lights of an airplane, lights of ships, will cause energy stored inside of the paint to glow. Such paint has utility as coatings for guard rails on roads, traffic signs, bridge rails, radio towers, high objects near airports, construction machinery, ship markings, oil platforms, powerline towers, fences, rear markers for vehicles, buoys and many others. It is also contemplated that the thermoluminescent materials of the present invention may be mixed with conventional fingernail polish to thereby provide a striking warm glow to the nails of the wearer.

Examples of typical vehicles for use with the thermoluminescent materials of the invention are:

Nail Polish
(for 10 ml.)
3–5 gr. nail polish clear;
1.0 gr. butyl acetate;

-continued 0.3 gr. acetone
1.5 gr. thermoluminescent material
3.0 gr. nail polish colored such as ice pink
"Sun Lite" night glow paint
72% by wgt alkaloid base clear paint
1% colored pigment
2% dispersing additives
25% thermoluminescent material (percentage by weight)

As hereinbefore set forth, the first fusion temperature is about 1100° C. The first fusion temperature may be from about 1000° C. to about 1200° C., and the second heating temperature from about 600° C. to about 650° C. Within these limits, satisfactory materials are produced.

EXAMPLE

The crystalline thermoluminescent material may consist essentially of: a base material selected from the group of: alkaline earth metal sulfides; a fusible salt, there being at most 2 parts fusible salt for every 10 parts of base material by weight; lanthanum trioxide: europium trioxide; and cerium oxide. The thermoluminescent material provides electron trapping with trap depths between 0.4 eV and 0.7 eV.

The thermoluminescent material has between 100 and 1000 parts per million of lanthanum trioxide, preferably 600 plus or minus 10% parts per million of lanthanum trioxide. The thermoluminescent material has between 100 and 1000 parts per million of europium trioxide, preferably 300 plus or minus 10% parts per million of europium trioxide. The thermoluminescent material has between 100 and 1000 parts per million of cerium oxide, preferably 600 plus or minus 10% parts per million of cerium oxide. The base material is preferably strontium sulfide. The fusible salt may be lithium fluoride and there is up to 20 parts fusible salt for 100 parts of base material by weight. The thermoluminescent material is in the form of powder having crystalline granules.

The thermoluminescent material may be combined with a liquid vehicle to form a paint. As used herein, "paint" shall mean any material commonly referred to as paint, dye or other coloring agent.

Using the above guidelines, a mixture may be made having the following preferred composition:

100 parts by wgt SrS
10 parts by wgt LiF
600 ppm by wgt $La_2O_3$
300 ppm by wgt $Eu_2O_3$
600 ppm by wgt $CeO_2$ The mixture is heated to about 1,000° C. in a furnace to form a fused mass.

The fused mass is ground to a fine powder having particle sizes from 1 to 100 microns After grinding, the powdered material is heated at about 600° C. and below fusing temperature for 30 minutes. The resultant material has the emission spectrum of FIG. 2.

The cooled reheated powder may then be mixed with a suitable binder or vehicle to form a paint.

Although the above-listed quantities are preferred, the mixture of Example I can include from 0 to up to 20 parts by weight of fusible salt (preferably lithium fluoride); i.e., the fusible salt is not absolutely necessary. Additionally, the lanthanum, europium and cerium dopants may be oxides as in the preferred embodiment or other compounds such as fluorides, chlorides, or other halides, nitrides or sulfides. Regardless of which of the compounds is used, the lanthanum, europium and cerium dopants are each provided in a quantity of between 100 and 1000 parts per million by weight.

The mixture of the above example with all three dopants ($La_2O_3$, $Eu_2O_3$, and $CeO_2$) has very deep trap depths in the range of 0.4 eV to 0.7 eV and thus longer decay times than the mixtures set forth in U.S. Pat. Nos. 4,818,434 and 4,755,324, which do not include the cerium dopant.

From the above example, the invention will be seen in its broad aspects as including a base material of alkaline earth metal sulfides, a first dopant of a lanthanum compound, and a second dopant of an europium compound, and a third dopant of a cerium compound, forming a thermoluminescent material with a long life in terms of light output decay.

As used herein, percentages and parts for mixtures are by weight, unless indicated otherwise.

Although specific illustrative examples have been presented herein, various modifications will be apparent. Accordingly, the scope of the present invention should be determined by reference to the claims appended hereto.

What is claimed is:

1. A thermoluminescent material consisting essentially of:
   (a) a base material consisting of strontium sulfide;
   (b) a first dopant consisting of between 100 and 1000 parts per million by weight of a lanthanum compound selected from the group consisting of lanthanum oxide, lanthanum halide, lanthanum nitride, and lanthanum sulfide; and
   (c) a second dopant consisting of between 100 and 1000 parts per million by weight of a europium compound selected from the group consisting of europium oxide, europium halide, europium nitride, and europium sulfide; and
   (d) a third dopant consisting of between 100 and 1000 parts per million by weight of a cerium compound selected from the group consisting of cerium oxide, cerium halide, cerium nitride, and cerium sulfide: and
   wherein said thermoluminescent material provides electron trapping with trap depths in the range of between 0.4 eV and 0.7 eV.

2. A thermoluminescent material consisting essentially of:
   (a) a base material consisting of strontium sulfide;
   (b) a fusible salt comprising lithium fluoride, there being at most 2 parts lithium fluoride for every 10 parts of base material by weight;
   (c) a first dopant consisting of between 100 and 1000 parts per million by weight of a lanthanum compound selected from the group consisting of lanthanum oxide, lanthanum halide, lanthanum nitride, and lanthanum sulfide;
   (d) a second dopant consisting of between 100 and 1000 parts per million by weight of a europium oxide, europium halide, europium nitride, and europium sulfide; and
   (e) a third dopant consisting of between 100 and 1000 parts per million by weight of a cerium compound selected from the group consisting of cerium oxide, cerium halide, cerium nitride, and cerium sulfide;
   wherein said thermoluminescent material provides electron trapping with trap depths in the range of 0 4 eV and 0.7 eV.

* * * * *